United States Patent [19]

Scilipoti

[11] Patent Number: 4,593,981

[45] Date of Patent: Jun. 10, 1986

[54] BIFOCAL CONTACT LENS

[75] Inventor: Joseph F. Scilipoti, Bayside, N.Y.

[73] Assignee: Master Contact Lens Labs Inc., Elmont, N.Y.

[21] Appl. No.: 492,351

[22] Filed: May 6, 1983

[51] Int. Cl.$^4$ .......................... G02C 7/04; G02C 7/06
[52] U.S. Cl. ..................................... 351/161; 351/177
[58] Field of Search ............... 351/160 H, 160 R, 161, 351/162, 177

[56] References Cited

U.S. PATENT DOCUMENTS

Re. 25,286 11/1962 De Carle ............................ 351/161
4,418,991 12/1983 Breger ................................. 351/161
4,525,043 6/1985 Bronstein ............................ 351/161

FOREIGN PATENT DOCUMENTS 2086605 5/1982 United Kingdom ............ 351/160 R

Primary Examiner—John K. Corbin
Assistant Examiner—Scott J. Sugarman
Attorney, Agent, or Firm—Wyatt, Gerber, Shoup, Scobie & Badie

[57] ABSTRACT

A bifocal contact lens having a curved anterior (outside) surface and a curved posterior (inside) surface is formed from a lens blank. The lens corrects for near vision, for example, of a presbyope, by a full-hemisphere spherical depression (seg) in the center of the posterior surface which becomes filled with tear liquid. The ring-like peripheral area, beyond the depression, at the posterior surface, has a curvature which matches the cornea of the wearer and permits a gap for tear liquid flow, the curvature of the peripheral area having a larger radius than the radius of the depression. The ring-like zone formed by the junction of the depression and the peripheral area is smoothed by a velveteen cloth polishing operation to form a transparent curved zone which permits near, far and intermediate distance viewing by the wearer through the center of the lens and without movement of the lens on the cornea.

5 Claims, 4 Drawing Figures

BIFOCAL CONTACT LENS

BACKGROUND OF THE INVENTION

The present invention relates to contact lenses to correct vision and more particularly to bifocal contact lenses.

There have been efforts to make bifocal contact lenses which provide both for reading and for more remote viewing, for eyes having limited muscular range of focus. Such efforts generally involved, in the past, attempts to permit the contact lens wearer to shift focus by looking through a smaller part of the lens having a greater magnifying effect. The magnifying effect was obtained by using a material of higher refractive index than the rest of the lens or by using a radius of external curvature of a part of the lens different from the radius of curvature of the remainder of the lens.

In U.S. Pat. No. 3,726,587 entitled "Bifocal Corneal Contact Lens And Method Of Making Same", a bifocal corneal contact lens consists of a curved disk-like segment having one index of refraction which is fused into an indentation in the surface of the contact lens body having a different index of fefraction. The fused segment has both inside and outside curvatures which are formed to correct the wearer's vision. In U.S. Pat. No. Re. 25,286 entitled "Bifocal Corneal Contact Lens", one zone of the lens is adapted to correct for distance vision and the other zone for reading vision. The distance vision zone is a small zone in the center which is one-half of the size of the pupil and has a slightly smaller radius of curvature than the remainder of the lens. A fused bifocal contact lens is shown in U.S. Pat. No. 3,472,581 entitled "Fused Multifocal Corneal Contact Lenses". The two materials that are employed have different refractive indexes and specifically the anterior has a high refractive index and the posterior portion has a lower refractive index, so that the distance portion of the lens is located at the center of the lens.

It is practically impossible to provide, in a contact lens, for a bifocal effect dependent upon shift of the line of vision (as in the case of bifocal glasses), because the cornea moves with the pupil in looking up and down. In order to present a differently made portion of the lens to the pupil when looking away from the center, the lens would have to slide over the cornea in response to eyelid friction. However, a contact lens is adapted to remain in one centered location on the cornea and cannot slide over the cornea in response to desired changes in focus.

OBJECTIVES AND FEATURES OF THE INVENTION

It is an objective of the present invention to provide a bifocal contact lens which enables the wearer to have good vision at near, intermediate and far distances and is as convenient to wear as a monofocal contact lens.

It is a further objective of the present invention to correct the vision of a person with presbyopia so that the person may see both far, intermediate and near distances without changing lenses.

It is a further objective of the present invention to provide such a contact lens which is compatible with the wearer's eye so that the lens may be worn all day without replacement or cleaning.

It is a further objective of the present invention to provide such a contact lens which is not tight-fitting, so that the corneal integrity and metabolism of the wearer is not disturbed.

It is a still further objective of the present invention that the lens may be adapted to correct for a variety of vision problems.

It is a feature of the present invention to utilize the layer of tear liquid, which has a refractive index of about 1.3375, between the cornea and the contact lens, as part of the lens system of the contact lens. The anterior (outside) curvature of the lens may be the appropriate contact lens curvature for near vision. The posterior surface (interior wall) of the contact lens is concave and curved to match the surface of the wearer's cornea. The posterior surface, at its center, has a concave "seg" (segment) in the form of a curved depression (dimple). The radius of curvature of the seg is smaller than the radius of curvature of the posterior lens surface. The seg is filled with tear liquid and not with air. The periphery (rim) of the seg is very well blended, preferably with a surface of velveteen cloth, to provide a very smooth curved transition zone which forms a blur circle. The blur circle zone is transparent and without a visible image.

It is found, using the contact lens of the present invention, that the wearer can shift his attention to the near-focused image, or intermediate image, or remote-focused image at will when the seg and its blur circle is suitably located and dimensioned, without interruption or impairment of vision.

The present invention has, through testing, been found to be practical. The theory behind the invention, although not essential to its practice, is believed to be as follows: The blur circle (smooth and clear zone) formed at the rim of the seg (depression) disperses divergent rays of light through the tear layer and through the pupil and onto the retina. The brain selects the rays so that the view appears normal.

The fit of the lens of the present invention is not tight against the cornea, as suggested in certain prior art bifocal contact lens systems. Instead, the lens is fitted with the same fit as a conventional monofocal lens, which permits a liquid tear flow under the lens. Such tear flow retains the eyes' normal metabolism and permits all-day wearing of the bifocal lens.

BRIEF DESCRIPTION OF THE DRAWINGS

Other objectives and features of the present invention will be apparent from the following detailed description and its accompanying drawings.

In the drawings.

DETAILED DESCRIPTION OF THE INVENTION

Figure 1:
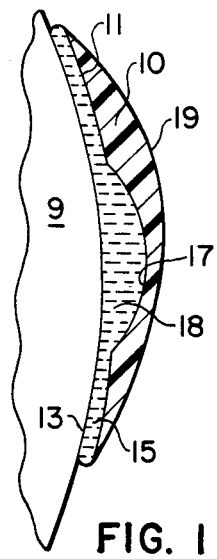
FIG. 1 is a vertical cross-sectional view showing a contact lens of the present invention positioned on the wearer's cornea.

As shown in FIG. 1, a contact lens 10, preferably made of a suitable contact lens transparent material, such as optical glass or plastic, has its posterior (inside) surface curvature 11 formed to correspond with the curvature of the outside surface 13 of the user's cornea 9. The posterior surface 11 is ring-like seen in the plane vertical to the optical axis. The lens 10 is separated from the cornea by a thin layer 15 of tear liquid.

Figure 2:
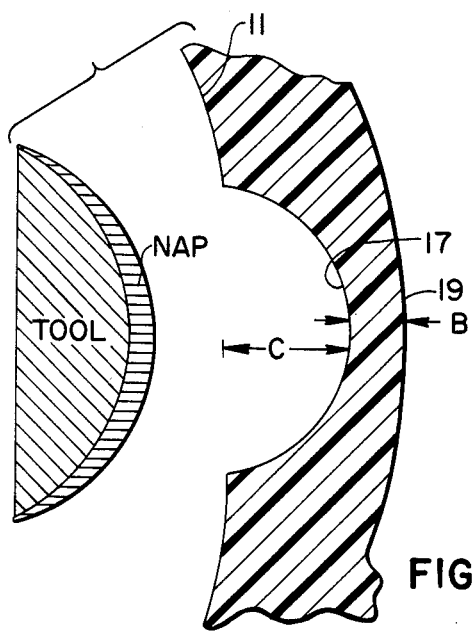
FIGS. 2 and 3 are cross-sectional views on an enlarged scale, compared to FIG. 1, of the central portion of the contact lens of the present invention, before polishing and after polishing, respectively.

As shown on a larger scale in FIG. 2, in the central part of the surface 11 of the lens there is a "seg" 17. The seg is a concave area in the form of a depression (well or dimple). The seg 17 has a greater curvature (i.e., smaller radius) than the remainder of the posterior curvature which is a spherical curvature 11. The tear layer 15, which is the normal tear liquid of the eye, fills the space 18 between the cornea of the eye and the surface of the seg 17, and also fills the seg 17. The lens has a normal "parallel fit", i.e., its posterior curvature fits the cornea with a gap of about 1.00 mm for pupil size up to 5.00 mm.

The curvature of the anterior (outside) surface 19 of the lens, in cooperation with the posterior curvature 11, is designed to provide the required near-vision correction. The lens of the present invention is particularly adapted to correct for "presbyopia". Presbyopia is the inability to accommodate to near-vision and is often caused by aging and may be corrected by convex lenses. The contact lens of the present invention is particularly adapted to correct for near vision or distant vision; but it also may be adapted to correct for astigmatism. For example, the posterior and/or anterior curves may be toric curves, bitoric curves, or lenticular for aphakes. The diameter of the seg and the lens may be adapted to the wearer's needs.

The curvature of the seg surface 17 is a spherical curve and is greater than the curvature of the posterior surface 11, the posterior surface 11 having the same curvature as the cornea surface 13; i.e., the radius of curvature of the seg is shorter than the peripheral radius. The term "diopter" (dioptrie) or "D" is a measure of the power of a lens. Its dimension is the reciprocal of length and its unit is the reciprocal of 1 meter. For example, the radius of curvature of the posterior surface 11 may be 8.03 mm=42:00 diopters, while the radius of curvature of the seg surface 17 may be 7.50 mm=45:00 diopters. If the curvature of the anterior surface 19 is 7.86 mm, the diopters of the portion of the lens formed by the posterior surface 11 and anterior surface 19 would be +1.12D, assuming an index of refraction of 1.490 for the lens material. The tear layer liquid does not affect this calculation because the thickness of the tear layer is uniform between the surface 11 and the cornea surface 13.

If the seg 17 were filled with tear liquid, assuming that the index of refraction of the tear liquid is 1.3375, the combined diopter power of the meniscus of the layer of tear liquid in the seg and between the seg 17 (radius 7.50=45.00 diopters) and the anterior surface 19 (radius 7.86) would be −300 diopters RX power.

The size of the diameter of the rim of the seg 17, designated A on FIG. 2, is selected to be compatible with the individual's pupil size. The normal dimension A is 3.5 mm to 5.0 mm. That diameter should be less than the diameter of the pupil when the eye is viewing a scene or object in strong, but not abnormally strong, light. In reading under normal light, the pupil must receive sufficient light through the portion of the lens beyond the rim of the seg, i.e., the portion in which the posterior surface curvature 11 conforms to the curvature 13 of the cornea.

As illustrated in FIG. 2, the dimension B is the thickness of the lens when measured at its center axis. The thickness B is taken from the inside surface of the lens, at the seg 17, to its outside surface 19. The thickness B will vary, depending on the power of the lens. A high minus (−) lens will be thinner at its center axis than at its edge. Conversely, a high positive (+) lens will be thicker at its center axis than at its edge. In general, the thickness B will be in the range 0.05 mm to 0.80 mm.

In the illustrated example, the depth of the seg, dimension C in FIG. 2, is approximately 0.01 to 0.0190 mm and the dimension A is 2.00 to 7.50 mm, depending on the pupil size of the wearer and other lens-fitting requirements.

It is important that the rim of the seg be well-polished and smoothed to provide a "blur circle" which is a curved blending transition rather than a defined edge line or defined protrusion. The necessary blending is preferably done with a tool faced with velveteen cloth to polish the transition zone and to create the blur circle. Velveteen cloth is a textile fabric, for example, of cotton or nylon, having a short close weft-pile. Other cut velvet fabrics having a short soft dense pile may also be used. The blur circle provides an uninterrupted varifocal effect with progressive magnification from apex to periphery rather than a sudden change at the seg rim. This polishing operation creates the blur circle on the lens and permits the brain to select the focal point (distance) which the patient requires for reading, intermediate and distance viewing. The blur circle zone is a ring which is in the range of 0.1 mm to 0.4 mm, and preferably about 0.25 mm in width. It is a clear (transparent) optical surface without a visible line.

Figure 3:
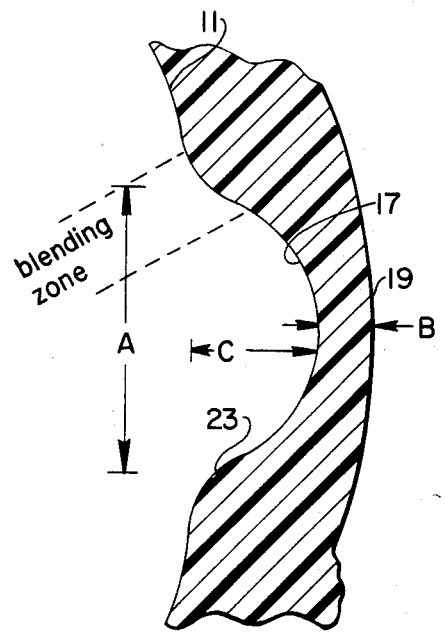

In the method of manufacture, preferably a lens blank is first formed by casting the lens material in a suitable mold, for example, of stainless steel or Teflon (T.M. of DuPont for polymer resin), in which the transparent material of the lens is cured. Alternatively, the lens blank may be injection- or pressure-molded or may be formed from a flat blank. Such lens blank formation is conventional in its use of a mold and in its selection of lens blank material. The posterior surface, and optionally also the anterior surface 19, is then finished by cutting in a lathe and polishing. Preferably the seg 17 is cast to its dimple shape and is then finished by the blending method to obtain the smoothed zone 23 shown in FIG. 3 using a velveteen polishing cloth, described above. For example, if the diameter A of the seg 17 is 3.5 mm with a steep full-hemisphere depression of completed radius 7.84 mm, then the velveteen cloth of thickness 0.040 mm is mounted on a radius tool of 7.44 mm in size for the polishing operation.

Figure 4:
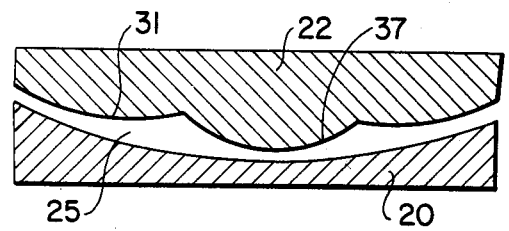
FIG. 4 is a cross-section of a mold showing the method of casting a contact lens of the present invention.

FIG. 4 shows a mold having a lower member 20 and an upper member 22 enclosing, when fitted together, a cavity 25 in which is located the fluid material, such as a plastic resin, which is to be hardened after being pressed in the mold. The top member 22 of the mold is pressed into place as shown in FIG. 4, and the excess material is expelled at the edges until the mold closes, at which time the cavity 25 is completely filled with the molding material. The curing is then performed, for example, by heat, according to the process appropriate for the particular material. The upper member 22 has a surface 31 corresponding to the surface 11 of FIG. 2 and a seg surface 37. Preferably, these surfaces meet in a defined circular line on the mold 22, so that a boundary line will be visible on the lens as cast. The lens blank is then polished with a tool having a velveteen surface to provide the necessary blending at the blur circle 23. The radius polishing tool carrying the velveteen polishing surface may conveniently have a convex curvature intermediate between that of the cornea and that of the seg.

The thickness of the lens is within the usual range of values for the appropriate material, and the diameter of the outer edge of the lens is likewise of the usual magnitude for a corneal magnitude.

It has been found that with the lens of the invention the wearer can distinctly see either near objects or intermediate objects or distant objects without interruptions in his vision. The eye views through the optical center of the contact lens. The distinct view provided by the corresponding portion of the lens, either the portion having the seg for distant objects or the (peripheral) remainder of the lens for near objects, are clearly seen, in spite of the less distinct outlines of the object provided by the other portion of the lens.

Modifications may be made in the above-described embodiment within the scope of the subjoined claims and within the scope of the invention. For example, the lens may be tinted to provide protection from the sun or for cosmetic purposes.

What is claimed is:

1. A bifocal contact lens made of a transparent contact-lens material and having an anterior surface of a selected curvature and a posterior concave surface having a peripheral portion for near viewing and having a spherical curvature and with a radius of curvature designed to fit the surface of a wearer's cornea with a parallel fit, and not a tight fit, so that a layer of tear liquid is maintained in a gap between said posterior surface and said cornea, and a central portion for distant viewing in the form of a depression in said posterior surface for holding tear liquid, the diameter of said central portion being at least 3.5 mm and its curvature being a spherical curve, which tear liquid in the depression acts as part of the lens system, the surface of said depression having a radius of curvature shorter than that of said peripheral portion; and a transparent zone of said posterior surface at the junction of said peripheral and central poritons, which zone is of rounded and smooth shape and from 0.1 mm to 0.4 mm in which so as to provide a gradual transition from the curvature of said peripheral portion to the curvature of said depression.

2. A contact lens as in claim 1 wherein said anterior surface has a uniform spherical curvature.

3. A contact lens as in claim 1 wherein said depression is a full hemisphere whose radius is smaller than the radius of the curvature of said peripheral portion.

4. A method of making a bifocal contact lens having anterior and posterior surfaces which consists of providing an anterior surface of selected curvature on one side of a lens blank of transparent contact lens material; providing a central depression for distant viewing on the posterior surface having a diameter of at least 3.5 mm, a spherical curvature, and a radius of curvature less than that of the curvature of the cornea of the wearer of the lens and also a peripheral portion for near viewing with a spherical curvature on the posterior surface beyond said depression and having a radius of curvature substantially the same as that of the cornea of the wearer of the lens, to form the lens with a parallel fit, and not a tight fit, and with a gap filled with tear fluid between said posterior surface and said cornea; and then blending the transition zone between the peripheral and central portions of said posterior surface to form an annular zone of 0.1 mm to 0.4 mm in width by polishing with a tool having a radius intermediate the radii of said central depression and said peripheral portion, so as to provide a gradual and smooth and transparent transition zone from the peripheral portion to the said depression.

5. A method as defined in claim 4 in which the step of blending is performed by polishing with a tool whose surface consists of velveteen cloth.

* * * * *